Jan. 25, 1927.
C. R. ATWOOD ET AL
1,615,563
AUTOMOBILE VISOR
Filed Nov. 30, 1923
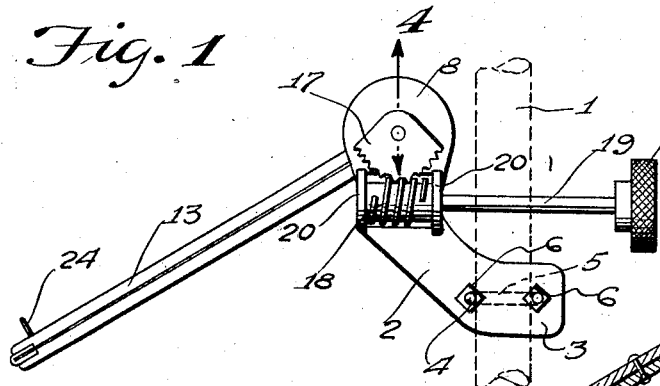
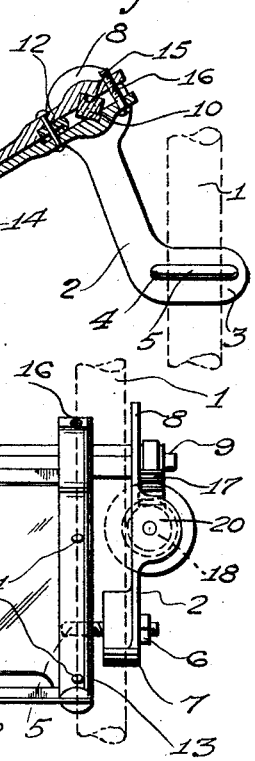
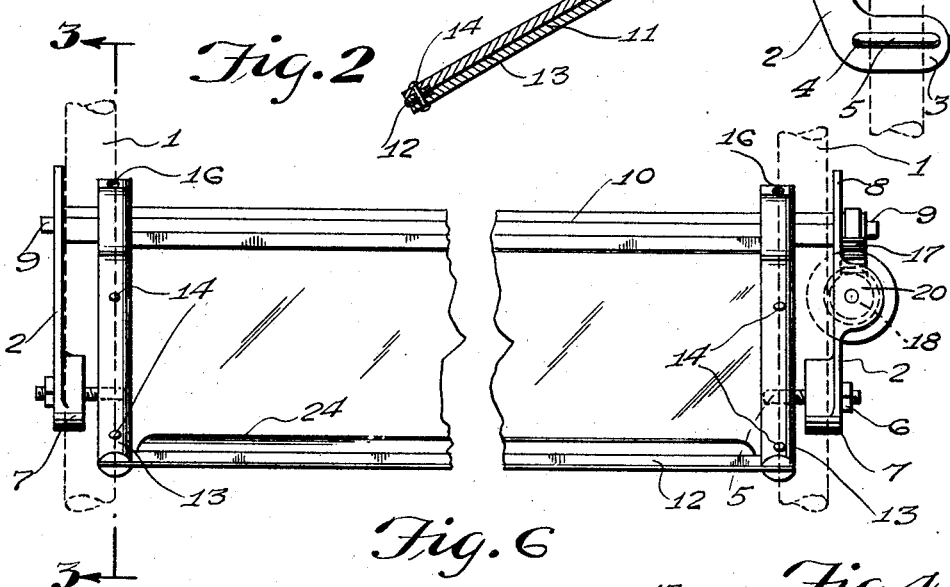
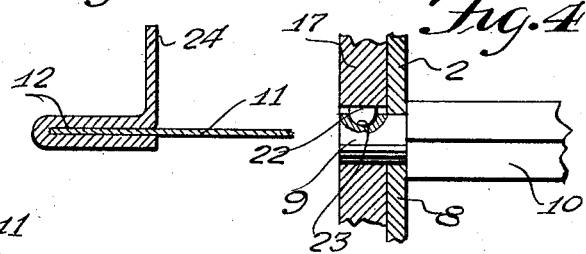
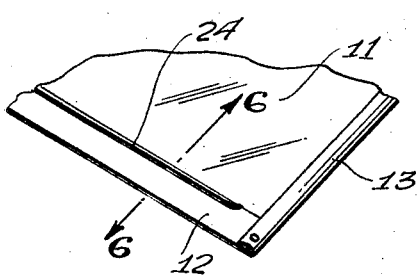
C. R. Atwood
H. Berg
O. R. Junkins
INVENTOR
BY Victor J. Evans
ATTORNEY Patented Jan. 25, 1927.

1,615,563

UNITED STATES PATENT OFFICE.

CLIFFORD R. ATWOOD, HENRY BERG, AND OLIVER R. JUNKINS, OF FAIRFIELD, IOWA.

AUTOMOBILE VISOR.

Application filed November 30, 1923. Serial No. 677,813.

This invention relates to new and useful improvements in visors particularly adapted for use upon the wind shields of motor vehicles. The main object of the present invention is the provision of a detachable visor adapted to be placed in position upon the wind shield of a motor vehicle to afford protection to the eyes of the operator against the glaring rays of the sun and also to protect a portion of the wind shield during rainy weather so that the view of the driver through the wind shield will not be obstructed in any way whatever by the contact of the rain with the wind shield.

Another object of our invention is the provision of a visor which can be quickly and readily placed in position upon various types of wind shields and whereby suitable means is provided for adjusting the visor to various positions with respect to the wind shield so as to not only provide a suitable shade for the operator of the vehicle but also protect portions of the shield against rain thus leaving a clear unobstructed view through the wind shield for the operator of the vehicle.

With the above and other objects in view the invention consists in the novel features in construction, the combination and arrangement of parts hereinafter more fully set forth, pointed out in the claim and shown in the accompanying drawings in which:

Fig. 1 is an end elevation illustrating our improved visor attached to the wind shield of a motor vehicle.

Fig. 2 is a front elevation.

Fig. 3 is a transverse section taken on the line 3—3 of Fig. 2.

Fig. 4 is a detail section taken on the line 4—4 of Fig. 1.

Fig. 5 is a fragmentary perspective view of the lower left or right hand corner of the visor frame illustrated in Fig. 2.

Fig. 6 is a fragmentary sectional detail view taken substantially on line 6—6 of Fig. 5.

Referring now more particularly to the drawings wherein reference characters are used to designate the several parts the numeral 1 indicates the side portions of a wind shield and detachably connected to the side portions 1 are the supporting arms 2 which are used for supporting our improved visor in position before the wind shield. As noted in the drawings the arms 2 are provided at their lower ends with substantially transverse portions 3 having spaced openings 4 for receiving the ends of a U clamp 5, the intermediate portion of which embraces the sides 1 of the wind shield as shown in the drawings and in order to retain the clamp in position suitable nuts 6 are threaded upon the ends of the same which will clamp the horizontal portions 3 of the arms 2 into engagement with the sides 1 of the wind shield.

The horizontal portions 3 of the arms 2 are provided with transverse recesses forming bracing lugs 7 which are disposed upon opposite sides of the side rails 1 so as to prevent any lateral play of the arms after being securely clamped in position upon the side rails by the U clamps 5. The upper ends of the arms 2 are provided with substantially circular bearing portions 8 having central openings therethrough to receive the reduced end portions 9 of the supporting shaft 10. Attention is directed to the fact that this shaft 10 is preferably rectangular in cross section with cylindrical end portions 9 which extend centrally through the plates 8 whereby the ends of the shaft 10 will be mounted in suitable bearings to permit rotation of the shaft.

The visor 11 may be formed of a suitable color glass or other desirable material and secured to each of its longitudinal edges are the U shaped clips 12 which serve as a suitable protection for the edges of the visor and extending across the ends of the visor 11 are the spaced plates 13 which are connected to the visor by having suitable rivets 14 extending through the plates and through the ends of the visor. The inner ends of the plates 13 are preferably arranged in spaced relation so as to embrace the clip 12 at the inner edge of the visor, and also be disposed upon opposite sides of the substantially rectangular shaft 10. It will be apparent that the inner face of the plates 13 at their inner ends are provided with substantially V shaped recesses 15 for receiving opposing corner portions of the shaft 10, as clearly shown in Fig. 3, and in order to retain the inner ends of the plates into clamping engagement with the shaft 10, set screws 16 are extended through the spaced ends of the plates 13 so as to draw the ends of the plate into tight clamping engagement with the shaft 10, whereby upon rotation of the shaft 10 the visor 11 may be adjusted to various angular positions with respect to the body of the wind shield.

In order to carry out the adjustment of the visor 11 a gear sector 17 is mounted upon one of the reduced ends of the shaft 10 and cooperates with a worm gear 18 carried by one of the supporting arms 2. The gear 18 is mounted upon a shaft 19 which in turn is mounted for rotation in the spaced ears 20 formed integral with one of the arms 2. The inner end of the shaft is provided with a finger piece 21 which is positioned upon the inner side of the wind shield so that the same may be readily accessible for manipulation by the operator of the vehicle. In order to retain the worm gear 18 against movement it will be noted that the same is mounted upon the shaft 19 between the spaced ears 20, and from the foregoing description it will be apparent that by grasping the finger piece 21 and imparting a rotary movement to the shaft 19 the shaft 10 will be rotated within its bearings through the worm gear 18 and gear sector 17.

In Fig. 4 we have illustrated the manner in which the gear sector 17 is keyed to the end of the shaft 10. In this connection we utilize a lock 22 formed upon the interior of the sector gear bearing which extends into the recess 23 formed in the end portion 9 of the shaft 10, whereby upon movement of the gear sector 17 the shaft 10 will be rotated simultaneously.

Attention is directed to the fact that the U shaped clip 12 which is arranged over the lower longitudinal edge of the visor 11 is provided with an outstanding flange 24 which extends at right angles to the visor 11, as clearly illustrated in Figs. 1 and 2.

As will be noted in Fig. 6 of the drawing the opposite ends of the flange 24 terminate a short distance from the plates 14 providing an unobstructed passage.

The flange 24 not only serves the purpose of stiffening or bracing the frame of the visor but at the same time will eliminate vibration to a certain extent. The flange will also guide the water from the wind shield during rainy weather so that it will not drip directly over the front of the wind shield but be guided to each end thereof.

While we have shown and described the preferred form of our invention we wish it to be understood that various changes and alterations may be carried out during the manufacture of the same without departing from the spirit of the invention or the scope of the appended claim.

Having thus described our invention what we claim is:—

A structure of the class described including a shield body, spaced plates arranged upon opposite sides of the body at each end thereof and defining at corresponding end portions substantially V-shaped recesses, a rotatable shaft having end portions substantially cylindrical in shape and an intermediate portion substantially rectangular in shape received by the U-shaped recesses, supporting arms having end portions defining bearing heads receiving the cylindrical end portions of the shaft, substantially U-shaped clips embracing opposite corresponding edges of the shield body, and an upturned guiding flange formed as an integral part of one of the clips and extending transversely of the shield body between the spaced plates and having end portions disposed in spaced relation with the spaced plates providing unobstructed passages.

In testimony whereof we affix our signatures.

CLIFFORD R. ATWOOD.
HENRY BERG.
OLIVER R. JUNKINS.